(12) United States Patent
Alexander (10) Patent No.: US 10,384,796 B2
(45) Date of Patent: Aug. 20, 2019

(54) AEROSPACE PLANE SYSTEM

(71) Applicant: Commercial Aerospace Plane Pty Limited, Double Bay (AU)

(72) Inventor: Nick Alexander, Bondi Junction (AU)

(73) Assignee: Commercial Aerospace Plane Pty Limited, Double Bay (AU)

( * ) Notice: Subject to any disclaimer, the term of this patent is extended or adjusted under 35 U.S.C. 154(b) by 0 days.

(21) Appl. No.: 15/017,462

(22) Filed: Feb. 5, 2016

(65) Prior Publication Data
US 2016/0152318 A1 Jun. 2, 2016

Related U.S. Application Data

(63) Continuation-in-part of application No. 14/390,470, filed as application No. PCT/AU2013/000348 on Apr. 4, 2013, now abandoned.

(30) Foreign Application Priority Data

Apr. 4, 2012 (AU) ................................ 2012901351

(51) Int. Cl.
*B64C 1/26* (2006.01)
*B64D 37/34* (2006.01)
(Continued)

(52) U.S. Cl.
CPC ................ *B64D 37/34* (2013.01); *B64C 3/10* (2013.01); *B64C 3/32* (2013.01); *B64C 30/00* (2013.01);
(Continued)

(58) Field of Classification Search
CPC .... B64C 1/26; B64C 9/00; B64C 3/10; B64C 3/32; B64C 5/08; B64C 39/12;
(Continued)

(56) References Cited

U.S. PATENT DOCUMENTS 2,699,906 A 1/1955 Lee et al.
2,925,712 A * 2/1960 London .................... F02C 7/224
60/39.08

(Continued)

FOREIGN PATENT DOCUMENTS

DE 2656692 12/1976
EP 0537933 4/1993
(Continued)

*Primary Examiner* — Medhat Badawi
*Assistant Examiner* — Vicente Rodriguez
(74) *Attorney, Agent, or Firm* — Moser Taboada (57) ABSTRACT

An aerospace plane having an elongate body supporting a pair of wings each having at least two angled, trailing edge portions. The pair of wings are adapted to extend away from the elongated body in opposing directions. A landing gear assembly is operatively associated with the elongated body to be moveable from a retracted position where the landing gear assembly is substantially locatable within the elongated body and an extended position where the landing gear assembly extends at least partially away from the elongated body. At least one engine adapted to generate thrust. At least one stabilizer adapted to assist with movement of the aerospace plane during flight. The at least one engine is located at least partially within an intake housing adapted to direct air into said at least one engine. The intake housing having at least one inlet door adapted to move from a fully open position, which allows air to pass into the engine, to a sealingly closed position which prevents air from flowing into the engine, when the engine is shut down during flight.

18 Claims, 4 Drawing Sheets

(51) Int. Cl.
  *B64C 3/10* (2006.01)
  *B64C 3/32* (2006.01)
  *B64D 27/18* (2006.01)
  *B64C 30/00* (2006.01)
  *B64D 31/00* (2006.01)
  *B64C 15/02* (2006.01)
  *B64C 39/12* (2006.01)
  *B64D 33/02* (2006.01)

(52) U.S. Cl.
  CPC ............ *B64D 27/18* (2013.01); *B64D 31/00* (2013.01); *B64C 15/02* (2013.01); *B64C 39/12* (2013.01); *B64D 2033/022* (2013.01); *B64D 2033/026* (2013.01); *Y02T 50/12* (2013.01); *Y02T 50/44* (2013.01)

(58) Field of Classification Search
  CPC .. B64C 25/34; B64D 37/34; B64D 2033/022; B64D 27/18; B64D 20/00; B64D 2033/0213; Y02T 50/44
  See application file for complete search history.

(56) References Cited

U.S. PATENT DOCUMENTS

| | | | | |
|---|---|---|---|---|
| 2,944,631 | A * | 7/1960 | Kerry | B64D 33/02 55/306 |
| 3,204,892 | A | 9/1965 | Powell | |
| 3,738,595 | A * | 6/1973 | Bouchnik | B64C 3/56 244/218 |
| 3,926,389 | A | 12/1975 | Mederer | |
| 4,703,905 | A | 11/1987 | Corbett | |
| 4,802,639 | A | 2/1989 | Hardy et al. | |
| 5,529,263 | A * | 6/1996 | Rudolph | B64C 30/00 244/15 |
| 5,538,201 | A * | 7/1996 | Gerhardt | B64C 3/10 244/204 |
| 5,667,107 | A * | 9/1997 | Lindsey | B65D 35/56 222/173 |
| 5,687,907 | A * | 11/1997 | Holden | B64C 15/02 239/265.35 |
| 5,842,666 | A * | 12/1998 | Gerhardt | B64C 3/10 244/15 |
| 5,956,960 | A * | 9/1999 | Niggeman | B64D 13/06 60/785 |
| 6,119,985 | A | 9/2000 | Clapp et al. | |
| 6,164,596 | A * | 12/2000 | Kothari | B64C 3/10 244/158.1 |
| 6,923,403 | B1 * | 8/2005 | Dizdarevic | B64C 1/0009 244/117 R |
| 6,938,854 | B2 * | 9/2005 | Nelson | B64C 1/0009 244/120 |
| 7,762,077 | B2 * | 7/2010 | Pederson | B64C 30/00 60/767 |
| 8,056,852 | B1 * | 11/2011 | Dizdarevic | B64C 3/10 244/36 |
| 8,113,468 | B2 | 2/2012 | Patel et al. | |
| 2005/0051666 | A1 | 3/2005 | Lee et al. | |
| 2005/0211822 | A1 * | 9/2005 | Franchet | F02K 3/025 244/12.3 |
| 2010/0276545 | A1 | 11/2010 | Chavagnac et al. | |

FOREIGN PATENT DOCUMENTS

| | | |
|---|---|---|
| EP | 0537933 A1 | 4/1993 |
| EP | 0537933 B1 | 4/1993 |
| EP | 0778415 | 6/1997 |
| FR | 2954275 | 12/2009 |
| WO | 9839207 | 9/1998 |
| WO | WO 98/39027 * | 9/1998 |
| WO | WO9839207 | 9/1998 |
| WO | WO03086860 | 10/2003 |

* cited by examiner

AEROSPACE PLANE SYSTEM

CROSS-REFERENCE TO RELATED APPLICATION

This application claims priority as a Continuation-In-Part application to Regular application U.S. Ser. No. 14/390,470 filed Oct. 3, 2014, which claims priority to PCT/AU2013/000348 filed Apr. 4, 2013, which in turn claims priority to Australian patent application No. 2012901351 filed Apr. 4, 2012.

FIELD OF THE INVENTION

The present invention relates to an aerospace plane and in particular to a commercial aerospace plane system.

BACKGROUND OF THE INVENTION

Airplanes are vehicles capable of flight by way of wings that interact with pressure and airflow to generate lift. A wing has an air foil cross sectional shape that generates lift by creating a pressure differential where there is a high pressure below the wing and low pressure above the wing. In this way the pressure differential supports the weight of the aeroplane in flight.

Airplanes have been utilised extensively since the 1950's to transport people and goods about the troposphere. The troposphere ranges from about 0 km to 12 kms from the earth's surface. An airplane typically includes, among other components, a body or fuselage, one or more wings intersecting the fuselage, landing gear to assist take-off and landing, an engine to provide thrust and a series of stabilisers to assist with control. Stabilizers are typically surfaces extending from the plane (such as around the tail) that have panels that can be moved by the pilot or onboard computer to assist in stabilizing the plane during flight. Most commercial airliners have both vertical stabilizers (incorporating a rudder) and horizontal stabilizers (incorporating an elevator) at the tail of the plane. The stabilizers are moved by the pilot manually or automatically by way of an onboard control computer connected by cables to a series of motors or actuators that mechanically move the panels (stabilizers) as needed.

Further developments have seen airplanes and space planes fly nonstop around the world and reach the stratosphere (about 12 km to 50 km), mesosphere (50 to 80 km), thermosphere (80 to 700 km) and exosphere (700 km to 10,000 km). With the ongoing use of airplanes for transport and the future of space tourism, there is a need for commercial aerospace planes (a combination of an airplane and space plane). There is also a need for an "aerospace plane system" for military applications. Such an aerospace plane should be fuel efficient and capable of a global transit (21600 nautical miles—nm) and capable of semi-planetary navigation (that is, reaches the thermosphere, the lower part known as the ionosphere) with a payload that is competitive in the commercial aviation arena.

The aerospace plane system should be sufficiently efficient to reduce the overall fuel flow to an average of 5.34 t/hr at Boeing 777 payloads with beyond Boeing 777 ranges to approximately 11000 nm and arrive at the destination with suitable fuel reserves, for example.

Airplane efficiency is effected by the AC (aerodynamic centre) and CG (centre of gravity) position relationship. Therefore, consideration must be given to the vertical and horizontal stabilizers which are currently utilized in most commercial planes. Currently a net downward balancing force is created by a horizontal stabilizer resulting in 'induced and trim' drag reducing aerodynamic efficiencies. This significantly reduces aircraft range and payload capacity for a given fuel load.

The McDonnell MD-11 for example, was designed as a relaxed stability airplane and some jet upsets (unusual flight attitudes) resulted. Attitude is the planes angle, up or down with respect to the earth. Jet upsets are extremely undesirable and it is therefore important to both design flight control software and flight control surfaces with sufficient power, $C_M$ (Coefficient Moment) and size to overcome these issues.

Present commercial airliners fly in the 33 000' to 39 000' range resulting in higher indicated airspeeds, than aircraft flying at higher levels beyond 60 000', which results in much higher fuel usage rates. Therefore at lower altitudes more fuel is required to fly a specific distance, this increases costs, limits ranges and reduces payload/revenue. To achieve lower fuel flows a diversion from traditional commercial airplane shapes is desirable so that a majority of the flight is conducted with the CG (centre of gravity) aft (rear) of AC (Aerodynamic centre) and therefore CG management is required to achieve this.

There is also a need to design an aerospace plane capable of flying extreme ranges and carry more payload per unit of fuel used than existing commercial airplanes.

Also, current commercial airplanes require at least two crew members to operate a plane where up to six pilots (as relief crew) may be required to fly extreme ranges to comply with Federal Aviation Regulations (FARs) or the equivalent. This increases airplane operating costs by requiring more crew to operate a fleet of airplanes. Accordingly, there is a need to design an aerospace plane to be operated by one crew member only thereby reducing labor costs therefore requiring fewer relief crews for extreme range operations.

It is an object of the present invention to substantially overcome or at least ameliorate one or more of the disadvantages of the prior art, or to at least provide a useful alternative.

SUMMARY OF THE INVENTION

There is disclosed herein an aerospace plane having:

an elongate body supporting a pair of wings, the wings being adapted to extend away from the body in opposing directions;

a landing gear assembly operatively associated with the body to be moveable from a retracted position where the assembly is substantially locatable within the body and an extended position where the assembly extends at least partially away from the body;

at least one engine adapted to generate thrust;

at least one stabilizer adapted to assist with stable movement of the aerospace plane, wherein the at least one engine is located at least partially within an intake housing adapted to direct air into the at least one engine, the intake housing having at least one inlet door portion adapted to move from a fully open position to allow air into the engine and a sealingly closed position to prevent air flowing into the engine when the engine is shut down during flight; and wherein the aerospace plane operates with aerodynamic centre forward of or coincident with the aerospace plane's center of gravity when operating subsonic and supersonic.

Desirably, the at least one engine is adapted to be placed on standby (shutdown) in flight to save fuel.

Desirably, the aerospace plane includes a tail, the tail extending from a rear end of the body and including a further engine and one or more stabilizers.

Desirably, the aerospace plane includes a hybrid wing body shape.

Desirably, the hybrid wing body has a wing leading edge and a wing trailing edge, the wing trailing edge includes at least two (2) angled portions.

Desirably, the at least one engine includes one or more pressure doors located within the intake housing adapted to maintain engine temperature when shut down by sealing the engine and allowing air pressure from a cabin air outflow to increase pressure within an engine compartment and thereby a temperature within the engine to equal a temperature within the cabin.

Desirably, a heater is included to heat fuel within the aerospace plane. The heated fuel being distributed about an upper surface of the wings to inhibit the aerospace plane icing ameliorating the need for deicing vehicles and the personnel needed to operate such vehicles prior to the aerospace plane's preparation for flight before take-off.

Desirably, the at least one stabilizer includes one or more elevators incorporated into the leading edge of the wings.

Desirably, the aerospace plane includes a pair of elevators at a front end of the body and a pair of stabilizers at a rear end of the body to assist a pilot with controlling stability of the aerospace plane.

Desirably, the aerospace plane includes three (3) engines, one on each wing and one at a base of the tail.

Desirably, the thrust of the aerospace plane is vectored thrust.

Desirably, the aerospace plane maintains steady flight by using the aerospace plane's vectored thrust to move a nose of the aerospace plane up and/or down as required.

Desirably, the pressure doors include a front engine pressure door and an aft engine pressure door to prevent engine cold soak and achieve successful engine relight, whereby the front engine pressure door swings forward and is held in place by a pressure differential from cabin outflow air; the aft engine pressure door swings forward and locks in place using a similar locking mechanism as a cabin entry/exit door and is held in place by a differential air pressure.

BRIEF DESCRIPTION OF THE DRAWINGS

A preferred embodiment of the present invention will now be described, by way of an example only, with reference to the accompanying drawings wherein.

DETAILED DESCRIPTION OF THE INVENTION

Figure 1:
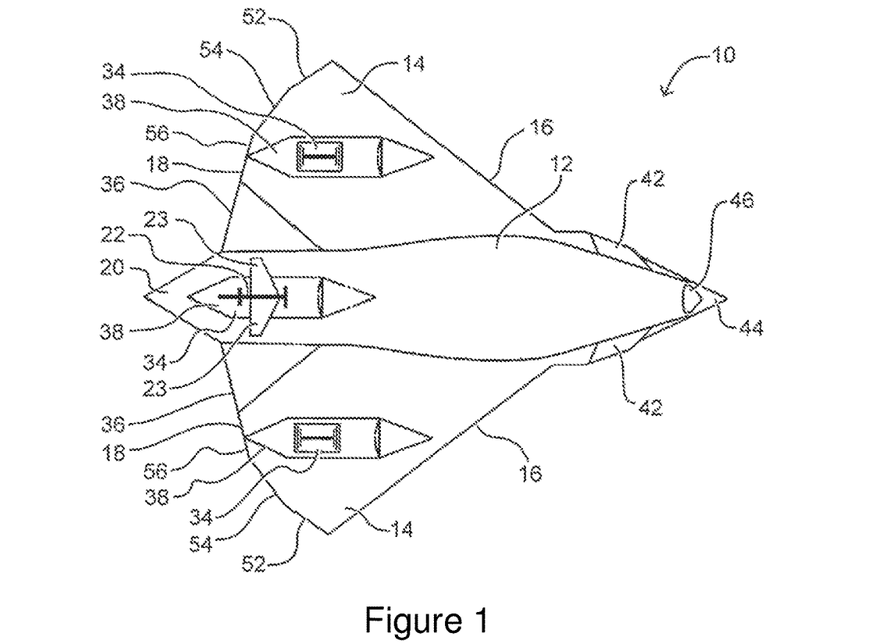
FIG. 1 is a top view of an extreme range aerospace plane of the present invention which is capable of operating subsonic up to 60,000 feet and at supersonic speeds above this altitude.
Figure 2:
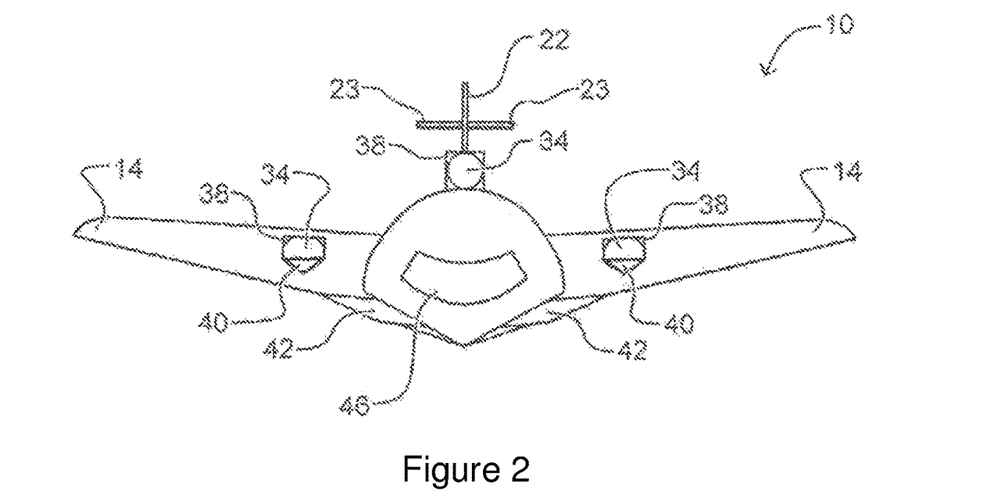
FIG. 2 is a front view of FIG. 1.
Figure 3:
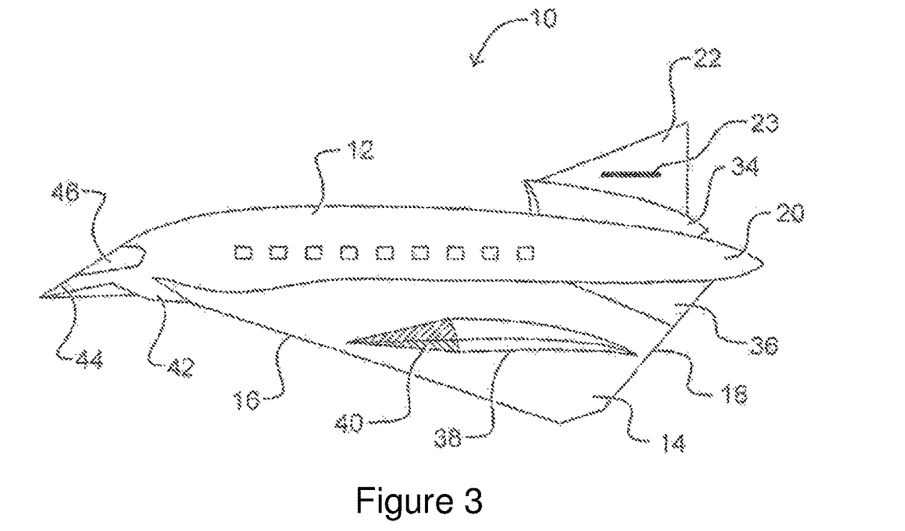
FIG. 3 is a side view of FIG. 1.

Referring to FIG. 1, an aerospace plane 10 has an elongate body 12 supporting a pair of wings 14, 14. Each of the pair of wings 14, 14 has a leading edge 16 and a trailing edge 18. The pair of wings 14, 14 is adapted to extend away from the elongate body 12 in opposing directions. The pair of wings 14, 14 have an approximate triangular shape with the hypotenuse of each wing 14, 14 aligned essentially parallel with the elongate body 12. Each of the pair of wings 14, 14 is a mirror image of one another. Each of the pair of wings 14, 14 angle backward and outward from the elongate body 12. The elongate body 12 has a rear end 20 and a tail 22. Each of the pair of wings 14, 14 is widest as it approaches the tail 22. The tail 22 extends upward from the elongate body 12 approximate the rear end 20. The tail 22 also extends away from a rear end 20 of the elongate body 12. The tail 22 can include at least one second stabilizer 23. A pair of second stabilizers 23, 23 is depicted in FIGS. 1 and 2.

Figure 4:
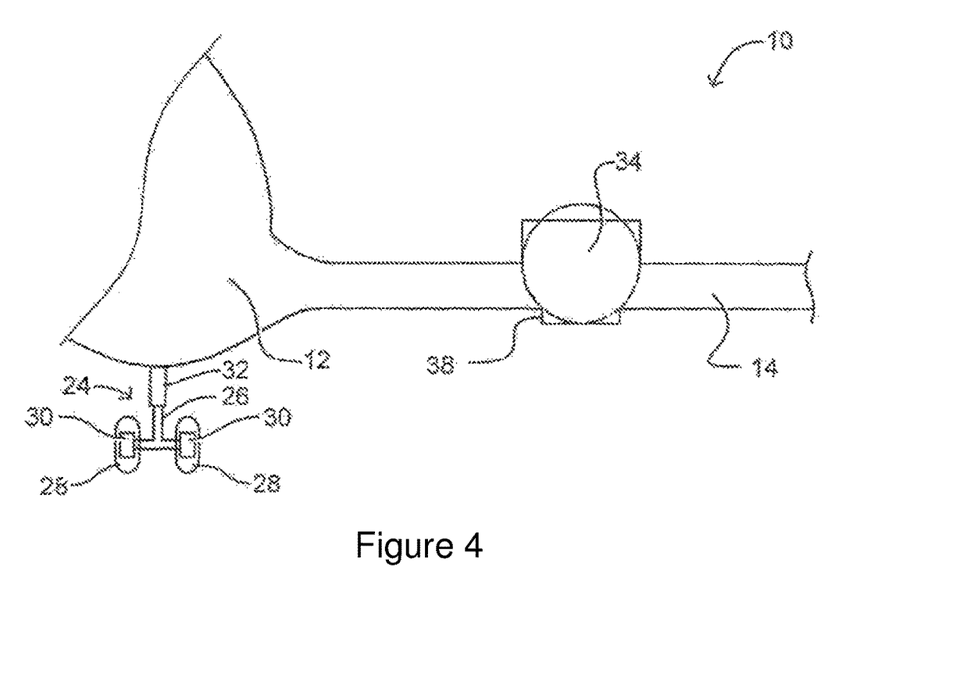
FIG. 4 is a partial view of a wing of the plane shown in FIG. 1.

Referring to FIG. 4, a landing gear assembly 24 is operatively associated with the elongate body 12. The aerospace plane 10 can have two or more a landing gear assemblies 24. One landing gear assembly 24 is shown in FIG. 4 but a second landing gear assembly 24 can be positioned farther back on the elongate body 12. Alternatively, two landing gear assemblies 24, 24 can be positioned side by side farther back along the elongate body 12. Those skilled in aircraft design and development are well aware of the various landing gear assemblies 24, 24 which can be utilized, as well as the placement of such assemblies 24, 24 so as to adequately handle the weight of the aerospace plane 10 during takeoff and landings. The landing gear assembly 24 includes a landing gear mechanism 26. The landing gear mechanism 26 includes one or more rotatable tires 28, 28 each mounted on a wheel 30, 30. The tires 28, 28 and wheels 30, 30 are mounted to a support structure 32 that can be constructed to pivot or move downward, away from the elongate body 12, and be locked into a vertical position for landing. The landing gear mechanism 26 can pivot or move upwards into the elongate body 12 when the aerospace plane 10 becomes airborne. Those skilled in airplane construction are aware of how this can be accomplished. Depending on the size, shape and weight of the aerospace plane 10, two or more landing gear assemblies 24, 24 can be used with one located toward the front of the elongate body 12 and the other located rearward of the center of the elongate body 12. Normally, each of the landing gear assemblies 24, 24 is movable between a retracted position, where the landing gear assemblies 24, 24 are substantially located within the elongate body 12, and an extended position, where the landing gear assemblies 24, 24 extends at least partially away from the elongate body 12, as is typical in most commercial airliners. The landing gear assemblies 24, 24 are locked in the down or extended position.

Referring again to FIG. 1, the aerospace plane 10 includes at least one engine 34 to generate thrust. Three engines, 34, 34 and 34 are depicted in FIG. 1 with an engine secured to each wing 14, 14 and a third engine 34 secured above the elongate body 12 approximate the tail 20. Thrust is the force that moves the aerospace plane 10 through the air, to overcome the weight and drag of the aerospace plane 10 and move air about the wings 14, 14. At least one first stabilizer 36 is included and adapted to assist with movement and thereby flight stability of the aerospace plane 10. Desirably, a pair of first stabilizers 36, 36 is utilized. When a pair of first stabilizers 36, 36 are is present, each can be formed on the pair of wings 14, 14. Each of the pair of first stabilizers 36, 36 forms a portion of the trailing edge 18 of each of the pair of wings 14, 14. Desirably, each of the pair of wings 14, 14 has a single first stabilizer 36. Each of the pair of first stabilizers 36, 36 functions by moving upward and downward. The Pair of first stabilizers 36, 36 is not designed to move inward or outward. Each of the pair of first stabilizers 36, 36 should be less than about 20% of the surface area of each of the pair of wings 14, 14.

Each of the engines 34, 34 and 34 is located at least partially within an intake housing 38. The intake housing 38 can be secured to the wings 14, 14 or to the elongate body 12 approximate the tail 20. Each of intake housings 38, 38 and 38 functions to direct air into the respected engine 34. Each of intake housings 38, 38 and 38 has at least one retractable engine inlet/intake door 40 adapted to move from a fully opened position (see FIG. 5) to a sealingly, closed position (see FIG. 6) to prevent the air flow into the intake housing 38 and thereby the engine 34, such that the doors 40 seal and prevent air from entering the engine 34 after the engine 34 is shut down during flight by the pilot or by an onboard computer to assist with fuel efficiency.

In a preferred form, the aerospace plane 10 includes an engine 34 and an intake housing 38 located on each of the wings 14, 14. The aerospace plane 10 has a pair of elevators 42, 42 located near a front end (nose) 44 of the elongate body 12 which cooperate with the pair of stabilizers 36, 36 located near the rear end 20 of the elongate body 12 to provide stability to the aerospace plane 10 during flight. The nose 44 is formed on a forward end of the elongate body 12 and the aerospace plane 10 maintains steady flight by using vectored thrust to move the nose 44 of the aerospace plane 10 up and/or down as required. The aerospace plane 10 also has a tail 22 formed approximate a rear end 20 of the elongate body 12. The tail 22 can vary in design but generally extends vertically upward from the elongate body 12. An engine 34 can be mounted at or on the base of the tail 22. The engine could be mounted on the elongate body 12 approximate the tail 22. Alternatively, two engines 34, 34 could be mounted on or near the base of the tail 22. One engine 34 is depicted in FIG. 1 mounted to the elongate body 12 approximate the location of the tail 22. The engine 34 could also include a corresponding intake housings 38 and doors 40. The tail 22 could also include some form of pair of second stabilizers 23, 23, if desired. The pair of second stabilizers 23, 23 can extend horizontally outward from the tail 22. One of the pair of second stabilizers 23 would be located on each side of the tail 22. The size and shape of the pair of second stabilizers 23, 23 can vary.

Figure 6:
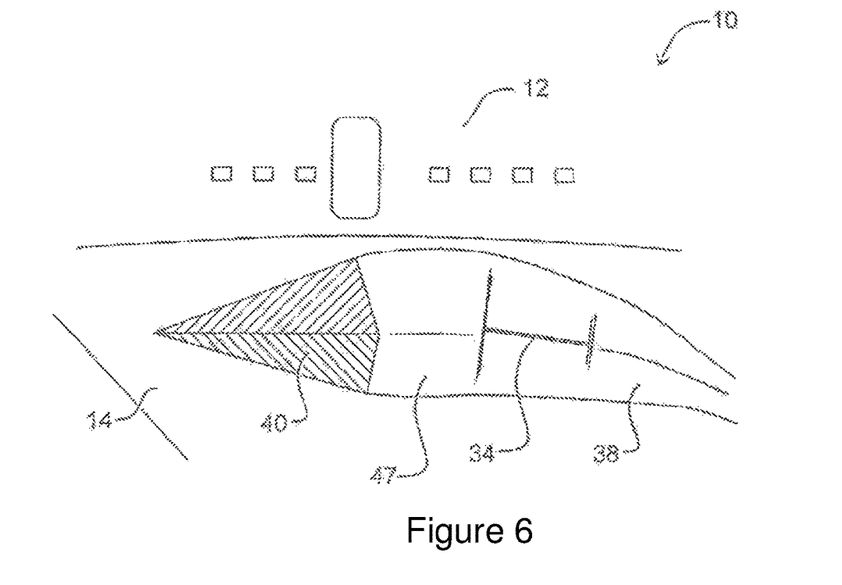
FIG. 6 is a partial view of a wing of the plane shown in FIG. 1 with the engine intake door closed.
Figure 7:
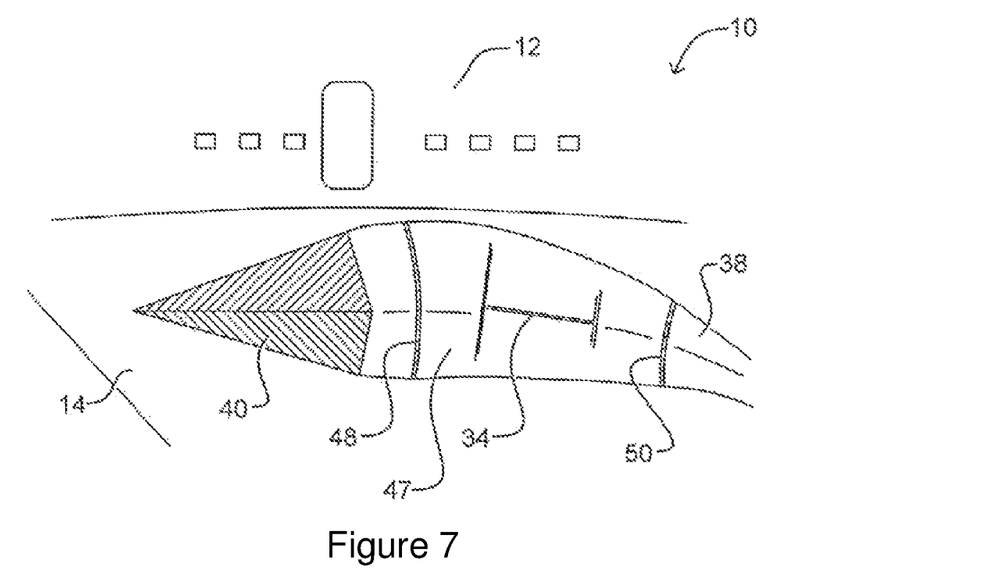
FIG. 7 is a further partial view of a wing of the plane shown in FIG. 1 with the engine intake door and pressure doors closed.

Due to the engine inlet/intake doors 40, the present invention at least in a preferred embodiment, can provide engine shut down throughout the flight profile. The engine intake doors 40 can extend completely to cover the engine intake housing 38 (as shown in FIGS. 6 and 7) to reduce drag. The intake doors 40 are discussed further later. This ensures that sufficient engine power is available during takeoff, from an airstrip of a predetermined length, and during the climb to a desired cruise altitude. If one or more of the three engines 34, 34 and 34 can be shut down during flight and be covered and sealed by the low drag intake doors 40, then overall fuel consumption could possibly be reduced and increase efficiency of the aerospace plane 10 can be achieved which will allow the aerospace plane 10 to fly further. The engine intake doors 40 and the overall structure of the engines 34, 34 and 34 can also produce lift due to their aerodynamic shape ameliorating the weight of the engines 34, 34 and 34.

The present invention, at least in a preferred embodiment, also includes multi axis vectored engine thrust technology so that the very large (heavy) vertical tail 22 and the pair of horizontal wing first stabilizers 36, 36, used for stability and yaw damping, are integrated into the pair of wings 14, 14. Vectored thrust is the changing of the direction of the exhaust thrust with reference to the longitudinal axis of the aerospace plane 10 to cause pitch up, down, left or right. This direction change is created typically by moving nozzles located adjacent to the exhaust. In this case, the vectored thrust ameliorates the stability and control issues caused by moving the intake doors. Each of the pair of wings 14, 14 contain one first stabilizer 36. Each of the pair of first stabilizers 36, 36 can be located adjacent to the elongate body 12. Alternatively, a smaller control surface may be used. Vectored thrust is the ability of an aerospace plane 10 to move in the direction or angle of the thrust with respect to the body of the engine 34. This movement is controlled by the pilot or by an onboard computer which assist with attitude control. Using vectored thrust allows the aerospace plane 10 to use a pair of smaller and lower weight first stabilizers 36, 36. Typically, vectored thrust uses nozzles (not shown) to deflect the exhaust air leaving each of the engines 34, 34 and 34. Another benefit of multi-axis vectored thrust engines 34, 34 and 34 is that heavy hydraulic and backup power systems for "roll" flight controls become redundant thereby reducing the overall weight and complexity of the aerospace plane 10. This makes more space available in the wings 14, 14 for fuel and reduces the overall weight of the aerospace plane 10 resulting in increased payload.

Further efficiency gains could be achieved by the ability to move the aerospace plane's 10 center of gravity (CG) through a large range to achieve an aerodynamic center (AC) which is located forward of, or coincident with, the center of gravity. This achieves relaxed stability of the aerospace plane 10 which, in turn, reduces "induced and trim" drag coefficient. This can significantly reduce fuel consumption during flight of the aerospace plane 10. The fuel can be transferred through pipes, transfer pumps and the like to maintain the aerodynamic center (AC) forward of center of gravity (CG). A variable center of gravity also allows for higher lift forward fuselage profiles (present commercial airplanes do not have high lift forward fuselage profiles) to further enhance the aerospace plane's 10 efficiencies in range, payload and lower fuel consumption. Also, flight of the aerospace plane 10 at higher mach numbers (higher than present day commercial aircraft) results in reduced flight times. This, in turn, results in maximizing daily usage of the aerospace plane 10. The aerospace plane 10 will be designed for single pilot operations thereby reducing pilot manning and training costs. The pilot will be seated in a cockpit 46.

A B777 class aerospace plane 10, for example, would include a three (3) engine configuration for adequate take off performance; adequate climb performance to achieve final cruise altitude early in the flight profile; and no intermediate level off altitudes before arriving at final cruise altitude. An example for managing cruise profiles to achieve very low fuel flow figures at final cruise altitude is set out below:

3 Engine cruise—20% beginning of flight;
2 Engine cruise—20% mid-flight;
1 Engine cruise—60% end flight.

Global fuel consumption figures for circumnavigation are as follows: a. Global Circumference 22,000 nautical mile (nm); b. 500 knot ground speed cruise; c. 250 tons of fuel; d. 15 tonnes reserve; e. 44 hours flight time at 500 knots ground speed; f. 235 tons/44 hrs=5.34 tons/hour.

A B777 class aerospace plane 10 with:
a. low enough fuel consumption for global circumnavigation (no payload), for example;
b. B777 size cabin and B777 size payload capacity, and c. a 737 PCN (Pavement Classification Number) increases the number of airfields at which the aerospace plane 10 can land has a significant advantage over existing commercial airplanes of the same size and weight.

A preferred embodiment of the present invention will result in approximately:
  a. 100% increase in range and endurance for the same fuel load;
  b. 30% speed increase, 6,000 nautical miles (nm) (100°) in 10 hours at Mach 1.3 which would take 13 hours in an A380 or similar aircraft;
    6,000 nm in 10 hrs.
    6,000 nautical miles (nm)
    6 hours
    3,000 nm at 500 knots TAS
    750 knots TAS for 4 hours=10 hours to make 6,000 nm
    1.3 Mach for 4 hours
  c. 10% payload increase Applications of such an aerospace plane 10 could include:
  a. Commercial and regional airplanes
  b. Corporate executive jet
  c. Military applications include:
    i. Secretaries of Defense and Foreign Affairs to and in theatre air transport
    ii. Commander's in Chief to and in theatre air transport
    iii. Air space dominance
    iv. Close air support
    v. Command and control
    vi. Special Forces insertion, communications and close air support.

The present invention, at least in a preferred form, could also include a one button push control (not shown) for PreFlight preparation, to support single pilot operations. This could include a sequence of:
  a. Auto wind uplink for Flight Plan (FPLN) assessment negating the requirement for companies to provide briefing and flight planning offices and staff to man these facilities;
  b. Auto upload digital Automatic Terminal Information Service (ATIS) fields on to Performance Calculation page;
  c. Air Traffic Control FPLN submission from aircraft.

The aerospace plane 10 would also include auto deployable onboard wind vanes (not shown). The wind vanes could provide wind speed and direction for autonomous automatic take off performance calculation, thereby reducing pilot workload since the aerospace plane 10 is operated by a single pilot. The wind speed and direction would be adjusted for taxi track and ground speed, temperature and pressure input from the onboard computer systems.

The present invention, at least in a preferred embodiment, could also provide methods of drag reduction such as: fly above 50,000 feet at lower airspeed and high subsonic Mach numbers and supersonic; positioning the aerodynamic center (AC) coincident with or forward of the center of gravity (CG) to ensure that the pair of first stabilizers 36, 36 (horizontal stabiliser and aileron) is set in an optimum lift/minimum drag position.

Reduced vertical stabilizer height or no vertical stabilizer, using vectored thrust for yaw stability and engine inoperative operations, would reduce weight and drag thereby reducing fuel required. This would also increase payload and revenue.

The single pilot cockpit 46 design for single pilot flight provides the aerospace plane 10 with:
  a. a capable pilot to handle takeoffs and landings; and
  b. therefore, only four (4) crew members (pilots) would be required on extremely long flights, those flights in excess of 20 hours.

It would also be advantageous if the aerospace plane 10 includes electric traction landing gear motors that can be powered by an Auxiliary Power Unit (APU) on the ground before the engines 34, 34 and 34 are started. This will help:
  a. taxi with one or more of the engines 34, 34 and 34 shutdown for fuel saving;
  b. to increase the spin of the wheels 30, 30 before touchdown thereby reducing tire wear and tear at touchdown with the runway. This feature also reduces damage to the tires 28, 28 and to the wheels 30, 30;
  c. by increasing the spin of the wheels 30, 30 before touchdown one can reduce or eliminate hydroplaning of the aerospace plane 10 in adverse weather conditions which enhances safety; and
  d. reduce ground handling jet blast issues which can also enhance safety.

The present invention, at least in a preferred embodiment, provides enhanced aircraft autonomy requiring minimal ground support and reduces ground handling expenses such as anti-icing and de-icing costs. This can be achieved by:
  a. pre-heating the fuel before aircraft refueling for autonomous de-icing/anti-ice on the ground;
  b. directing cabin conditioned air and engine bleed air into the space within the wings 14, 14 to ensure that the aerospace plane's 10 outer skin (upper surface) is at or above 10° C. to de-ice and anti-ice the aerospace plane 10;
  c. internally heated fuel—the fuel transfer system distributes heated fuel against the upper surface of the wing 14, 14 for de-icing;
  d. fuel tank pressure differential for fuel transfer to ensure rapid aerospace plane 10 center of gravity management;
  e. fuel transfer valves designed for efficient fuel transfer for center of gravity management, and
  f. wing space/ducting to allow the free flow of cabin outflow air for heating fuel tank space during high altitude flight.

The aerospace plane 10 could also include air suspension engine mounts for reducing passenger cabin noise and vibration reduction.

Soft switches (Graphic User Interface—GUI) and switch execution in checklists would be integrated into the Cockpit Engine Warning Displays (EWD), the Systems Displays (SD), and into the Multi-Function Displays to minimize physical switches on instrument, center and overhead panels.

The optimum aerodynamic center (AC), center of gravity (CG) relationship for the aerospace plane 10, is relaxed stability or the AC positioned forward of or coincident with the CG. The AC aft or behind the CG is counterproductive in terms of aerodynamic efficiency but the aerospace plane 10 is still capable of safely flying in this regime.

In flight, the centre of gravity (CG) is positioned slightly aft of the aerodynamic center (AC) to ensure the pair of first stabilizers 36, 36, the multi-axis thrust technology, and the pair of forward elevators 42, 42 (integrated into the leading edge extension 16) is in the minimum drag/optimum lift position. The benefit of the aerodynamic center (AC) being located forward of or coincident with the center of gravity is that the whole aircraft 10 acts as a lifting body as opposed to the standard commercial aircraft. For example, in the Airbus A380, the horizontal stabilizer creates a net downward stabilizing force. The resulting benefit of a relaxed stability aerospace plane 10 is significantly less 'drag', increased payload and range due to reduced fuel consumption and less fuel required for a given distance and payload.

Referring again to FIG. 1, the aerospace plane 10 includes a cockpit 46 formed in a forward portion of the elongate body 12. A pair of elevators 42, 42 extends horizontally outward from the elongate body 12. The pair of elevators 42, 42 are located rearward of the cockpit 46 and can angle backward towards the rear end 20 of the elongate body 12. The angle can be from about 30° to about 75°. An angle of about 60° works well. The pair of elevators 42, 42 can serve as a canard. By "canard" it is meant a short winglike control surface projecting from the fuselage of an aircraft, mounted forward of the main wing and serving as a horizontal stabilizer. The pair of elevators 42, 42 and the pair of first stabilizers 36, 36 cooperate in allowing the aerospace plane 10 to achieve aerodynamic efficiencies. The pair of elevators 42, 42 is located in a forward portion of the aerospace plane 10 adjacent to the elongate body 12. The pair of elevators 42, 42 could be formed as part of the leading edge of each of the pair of wings 14, 14, if desired.

Positioning the pair of elevators 42, 42 forward of the center of gravity (CG) and integrating them into the leading edge 16 (canard) will result in a Coefficient Moment ($C_M$) sufficient to manage an aerodynamic center (AC) and makes the aerospace plane 10 flyable in the event of direct flight control law requirement. "Direct flight control law" is where the pilot flight control inputs are not modified by computer software.

The fuel transfer proposed to manage the center of gravity (CG) of the aerospace plane 10 will establish the position of the pair of first stabilizers 36, 36 to produce optimum lift and minimum drag (the center of gravity (CG) dictates flight stabilizer position). The following sequence, for example, will result in optimum aerospace plane 1 lift configuration:
a. the pair of elevators 42, 42, the leading edge 16 and forward fuselage (nose) 44 produce lift;
b. fuel is positioned by differential air pressure between the fuel tanks provided by cabin outflow air or by fuel pumps to optimize the center of gravity (CG) position;
c. multi-axis vectored thrust will also have a slight nose down CM (Coefficient Moment) to maximize lift; and
d. this sets the optimum (optimum lift, minimum drag) position of the pair of first stabilizers 36, 36.

Figure 5:
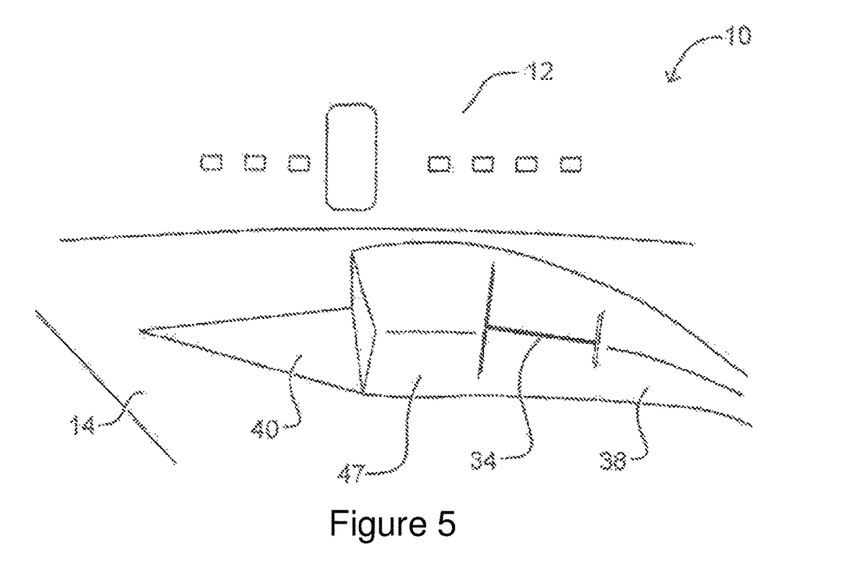
FIG. 5 is a partial view of a wing of the plane shown in FIG. 1 with the engine intake door open.

As best seen in FIGS. 5 to 7, the engines 34, 34 and 34 are fitted with retractable engine inlet/intake doors 40 in the shape of a wing cross-section or the like to provide lift when each of the engines 34, 34 and 34 is shutdown during flight and the engine intake door 40 is closed and sealed. The intake housing 38 could also have outlet/exhaust doors (not shown).

The aerospace plane 10 intake housing 38, in a preferred form, will be rectangular or similar shape to simplify intake door retraction and facilitate intake door seals (not shown). The engine intake doors 40 allow for the engines 34, 34 and 34 to shut down during flight to reduce fuel flow. Preferably, in the three (3) engine configuration, for example 50/more thrust is made available, for this airplane class which would normally only require two (2) engines. This helps with:
a. take off performance requires sufficient thrust from all three operating engines 34, 34 and 34 so that the aerospace plane 10 can take off on a given length of runway and climb to altitudes beyond 60,000 feet; and
b. the engine intake doors 40 are closed and the engines 34,34 and 34 are secured/shutdown when established at the final cruise level (covering the engine intake) producing lift and reducing fuel flow to achieve extreme range operations and increased payload due to less fuel required.

Referring again to FIG. 5, the intake doors 40 are open and the intake housing 38 is open. In FIG. 6, the intake doors 40 closed and sealed.

The primary operating technique (in a three engine airplane) is to operate on one (center) engine 34 for a major part of the flight to minimise fuel burn. The AC remains in approximately the same position with the engines 34, 34 running or shutdown with engine intake doors 40 closed. Therefore, jet engine intake through exhaust will follow a wing camber that produces equal lift at cruise thrust as with the intake doors 40 closed to minimise the movement of fuel to manage CG position.

In a preferred form, each of the engines 34, 34 can shut down at high altitude for prolonged periods of time where the temperature can reach a Static Air Temperature (SAT) of −57° C. This very cold temperature can result in failure to relight or restart an engine 34 due to engine 34 cold soak. By "cold soak" it is meant where fuel and/or oil freeze in the supply lines thereby rendering the engine inoperable due to a lack of fuel and/or oil supply.

Referring to FIG. 7, the intake housing 38 encloses the engine 34. The engine 34 can be closed off by a pair of pressure doors 48 and 50 which will prevent the outflow of pressurized cabin air. The pressure door 48 is a front engine pressure door and the pressure door 50 is an aft engine pressure door. The front engine pressure door 48 can be a single door or two doors which interact with one another. Likewise, the aft engine pressure door 50 can be a single door or two doors which interact with one another. The front and aft engine pressure doors, 48 and 50 respectively, function to maintain engine 34 temperature when the engine 34 is shutdown by sealing the engine compartment or the area 47 surrounding the engine 34. The front and aft engine pressure doors, 48 and 50 respectively, allow air pressure from a cabin air outflow to increase the air pressure within the area 47 surrounding the engine 34. This maintains the temperature of the air surrounding the engine 34 and keeps it equal to the temperature within the cabin.

The pair of pressure doors 48 and 50, when closed, will maintain the area surrounding the engine 34 (engine compartment) and prevent engine cold soak, thereby ensuring successful engine relight. In a preferred form:
a. the front engine door 48, located within the inside of the intake housing 38, can swing forward and be held in place by the pressure differential from the cabin outflow air;
b. the aft engine door 50, located within the inside the exhaust area of the intake housing 38, can swing forward and be locked in place using the same or a similar plug mechanism as the front engine door 48 and can be held in place by the differential air pressure; and
c. cabin outflow air is routed by piping to pressurize the engine bay (not shown) to maintain the engine temperature at approximately 23° C. to prevent engine cold soak, thereby ensuring an in-flight start for landing.

Referring again to FIG. 1, the pair of wings 14, 14 have a hybrid wing body shape. In this hybrid wing body shape, the trailing edge 18 of each of the pair of wings 14, 14 has at least two angled, trailing edge portions 52 and 54. Each trailing edge portion 52 and 54 defines a different angle which creates a direction change between the two trailing edge portions 52 and 54. Three angled, trailing edge portions 52, 54 and 56 are shown in FIG. 1. Each of the trailing edge portions 52, 54 and 56 extends towards the nose 44 of the aerospace plane 10. The angle of each of the trailing edge portions 52, 54 and 56 increases as the trailing edge portion 52, 54 and 56 are located farther away from the elongate body 12 of the aerospace plane 10. In other words, the trailing edge portion 52 is formed at a greater angle than the trailing edge portion 54, which in turn, is formed at a greater angle than the trailing edge portion 56. The trailing edge portion 56 is located adjacent to the elongate body 12. The trailing edge portion 52 is located farthest away from the elongate body 12 and the trailing edge portion 54 is located between the trailing edge portions 52 and 56. All of the three trailing edge portions 52, 54 and 56 are angled forward of a perpendicular line which intersects the elongate body 12 approximate the back edge of each of the pair of wings 14, 14. The trailing edge portion 56 extends forward from a perpendicular line intersecting the elongate body 12 approximate the back edge of each of the pair of wings 14, 14 at an angle of from between about 1° to about 20°. An angle of from between about 10° to about 18° works well. An angle of about 15° is good. The trailing edge portion 54 extends forward from a perpendicular line intersecting the elongate body 12 approximate the back edge of each of the pair of wings 14, 14 at an angle of from between about 21° to about 40°. An angle of from between about 25° to about 35° works well. An angle of about 30° is good. The trailing edge portion 52 extends forward from a perpendicular line intersecting the elongate body 12 approximate the back edge of each of the pair of wings 14, 14 at an angle of from between about 41° to about 70°. An angle of from between about 50° to about 60° works well. An angle of about 55° is good. The angles of the trailing edges 52, 54 and 56 can vary to suit one specific objective. Traditionally, a delta wing design generate intense jet wash which require increased separation, for safety reasons, between airplanes during take-off and landing. The hybrid wing body shape created by the at least two angled edge portions 52 and 54, of this invention, overcomes these issues. The differing angles of the edge portions 52 and 54 increases wing efficiency by:
a. acting as an aerodynamic winglet (as seen on many later airplanes) reducing outspan airflow at the wingtip;
b. the vortices attach to the trailing edge point resulting in self-cancelling vortices
i. this significantly reduces jet wash and therefore the time intervals between departing airplanes on take-off;
ii less intense jet wash in the landing pattern and final approach reduces time intervals between landing airplanes. This promotes similar takeoff and landing pattern separation as with other present airplanes.

An embodiment of the present invention can also include an enhanced cargo handling system allowing fast freight and munitions (military variant) loading through rear facing cargo access door/ramp, similar to a C17 aircraft.

Also, in another embodiment, the outboard engines 34, 34 and 34 can be pointed slightly inboard to facilitate one engine (OEC) asymmetric cruise and balanced flight in the event of a vectored thrust failure.

The landing gear assembly 24 can also include strut weight sensors to provide data so as to position the fuel for optimum center of gravity (CG) at takeoff.

Potable, stainless steel water tanks can surround each of the engines 34, 34 and 34 for aircraft protection and wing fuel tank/engine isolation in the event of a catastrophic engine failure.

The aerospace plane 10 can be accelerated supersonic by a Solid Rocket Booster (SRB), Aerospike Hylox or RP1 engine.

It is known that extreme cold temperatures in space and high altitude flight require the jet fuel to be maintained at a temperature above jet fuel freezing, above −40° F. It is proposed that the fuel in the aerospace plane 10 be pre-heated before takeoff. This will assist in preventing the fuel from freezing at high altitude.

Figure 8:
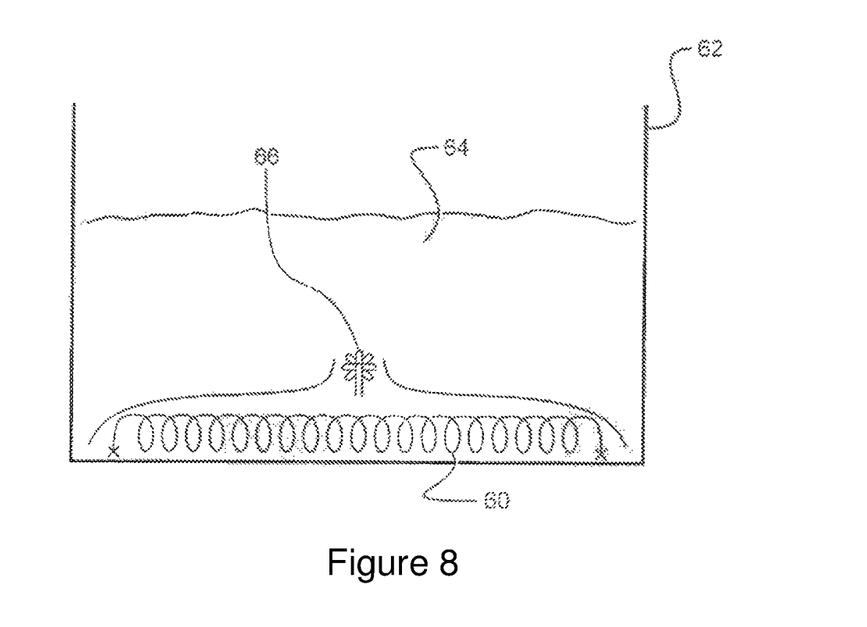
FIG. 8 is a cross-section of a fuel system heater.

Referring to FIG. 8, the aerospace plane 10 includes a fuel tank 62 which contains a quantity of fuel 64. The fuel tank 62 is connected to at least one of the engines 34. Desirably, the fuel tank 62 is connected to all three of the engines 34, 34 and 34. Alternatively, each engine 34 can have its own fuel tank 62. Fuel 64 is housed in the fuel tank 62. A heater 60 is positioned within the fuel tank 62. The heater 60 can include a heating element, such as an electrical coil, or the like. The heater 60 is capable of heating the fuel 64 and maintaining the fuel 64 at a temperature above −40° F. In other words, the heater 60 will prevent the fuel 64 from freezing.

The fuel 64 can be distributed by a single or contra-rotating propeller 66 through piping (not shown) inside the elongate body 12 and/or pair of wings 14, 14 of the aerospace plane 10 to ensure homogenous fuel temperature. The heated fuel 64 can be distributed about an upper surface of the pair of wings 14, 14 to prevent ice from building up on the pair of wings 14, 14 prior to takeoff. The heated fuel 64 can also inhibit the aerospace plane 10 from having to be deiced prior to take-off.

In an alternative embodiment, the aerospace plane 10 could be used as a Long Range Strategic Strike Bomber (LRSSB) extended time on station airspace dominator. This aerospace plane 10 can be fitted with forward, side and aft air defense radars for 360° coverage; a long and medium range radar guided and heat seeking air to air missiles, capable of firing forward and aft. Also, the aerospace plane 10 has the capability to carry large and diverse precision guided air to ground munitions.

Such an aerospace plane 10 would be capable of operating as an Unmanned Combat Aerial Vehicle (UCAV). The aerospace plane 10 will have 24/7 airborne endurance with approximately twenty-four (24) hours between aerial refueling.

Although the invention has been described with reference to specific examples, it will be appreciated by those skilled in the art that the invention may be embodied in many other forms including the Boeing hybrid wing body.

I claim:
1. An aircraft having a longitudinal axis, the aircraft comprising:
a) an elongate body supporting a pair of wings, said pair of wings extending away from said elongate body in opposing directions, and each of said pair of wings having
a trailing edge,
said trailing edge extending forward of an intersection of said elongate body and the trailing edge,
said trailing edge comprising at least two trailing edge portions, each trailing edge portion having an angle each with respect to the longitudinal axis forward of the intersection, wherein said each angle is acute, and wherein said angle of the trailing edge portion farther from said elongate body is smaller than said angle of the trailing edge portion proximal to said elongate body,
wherein the trailing edge portion proximal to said elongate body extends directly from said elongate body, wherein the trailing edge portion farther from said elongate body extends directly from the trailing edge portion proximal to said elongate body, and wherein said at least two trailing edge portions comprise a third trailing edge portion extending directly from said trailing edge portion farther from said elongate body, wherein a third angle formed between said third trailing edge portion and the longitudinal axis, facing a front end of the aircraft, is an acute angle, and wherein the third angle is smaller than said angle of the trailing edge portion farther from said elongate body;

b) a landing gear assembly operatively associated with said elongate body and moveable from a retracted position, where said landing gear assembly is substantially located within said elongate body, to an extended position, where said landing gear assembly extends at least partially outward and away from said elongate body;

c) jet engine adapted to generate thrust, said jet engine located within an intake housing adapted to direct air into said jet engine, said intake housing having at least one inlet door adapted to move from a fully open position, which allows air to pass into said jet engine, to a sealingly closed position, which prevents air from flowing into said jet engine when said jet engine is shut down during flight;

d) a pair of first stabilizers, with each of said pair of first stabilizers mounted to each of said pair of wings, and said pair of first stabilizers adapted to assist with movement of said aircraft during flight; and e) front and aft engine pressure doors located within said intake housing, said front and aft engine pressure doors adapted to maintain engine temperature when said jet engine is shutdown by sealing said jet engine, said front and aft engine pressure doors adapted to allow air pressure from a cabin air outflow to increase the air pressure in an area surrounding said jet engine inside each of said intake housings, and maintains a temperature surrounding each of said jet engine which is equal to a temperature within said cabin wherein said aircraft has a center of gravity and an aerodynamic center during flight, and said aerodynamic center is located forward of said center of gravity when said aircraft is operating at subsonic and supersonic speeds.

2. An aircraft comprising:

an elongate body having front end, a rear end, a longitudinal axis, a center of gravity (CG), and an aerodynamic center (AC), the front end comprising a nose, and the rear end comprising a tail;

at least two wings comprising a first wing and a second wing, each of the first wing and the second wing extending away from the elongate body and arranged symmetrically about the longitudinal axis, wherein each of the first wing and the second wing comprises:

a trailing edge extending from the elongate body, the trailing edge comprising at least two trailing edge portions comprising a first trailing edge portion and a second trailing edge portion, the first trailing edge portion is closer to the elongate body than the second trailing edge portion, wherein a first angle formed between the first trailing edge portion and the longitudinal axis, facing the front end, is an acute angle, wherein a second angle formed between the second trailing edge portion and the longitudinal axis, facing the front end, is an acute angle, wherein the second angle is smaller than the first angle, wherein the first trailing edge portion extends directly from the elongate body, wherein the second trailing edge portion extends directly from the first trailing edge portion, and wherein the at least two trailing edge portions comprise a third trailing edge portion extending directly from the second trailing edge portion, the third trailing edge portion farther from the elongate body than the second trailing edge portion, wherein a third angle formed between the third trailing edge portion and the longitudinal axis, facing the front end, is an acute angle, and wherein the third angle is smaller than the second angle; and at least two jet engines comprising a first jet engine and second jet engine, the first jet engine secured to the first wing, and the second jet engine secured to the second wing.

3. The aircraft of claim 2, further comprising:

at least two intake housings comprising a first intake housing and second intake housing, the first intake housing secured to the first wing and at least partially enclosing the first jet engine, the second intake housing secured to the second wing and at least partially enclosing the second jet engine, each of the at least two intake housings comprising:

at least one front pressure door located forward of the corresponding jet engine, and at least one aft pressure door located behind the corresponding jet engine.

4. The aircraft of claim 3, wherein each of the pressure doors is configured to allow air pressure from a cabin air outflow to increase the air pressure within an area surrounding the corresponding jet engine inside the corresponding intake housing, wherein the increased air pressure in the area surrounding the corresponding jet engine maintains the temperature of the air surrounding the corresponding jet engine equal to the temperature of the cabin air outflow, wherein each of the pressure doors is adapted to stay in place by pressure differential from the cabin outflow air, and wherein each of the pressure doors, when held in place, prevents air from entering in to the corresponding jet engine and shuts down the corresponding jet engine.

5. The aircraft of claim 3, further comprising at least one retractable inlet door adapted to move between an open position and a closed position, wherein in the open position, each of the intake housings directs air to the corresponding jet engine, and in closed position, each of the intake housing prevents air from entering the corresponding jet engine.

6. The aircraft of claim 5, wherein, when the aircraft is in flight, the at least one retractable inlet door is in the closed position preventing air from entering the corresponding at least one jet engine, the at least one front pressure door and the at least one aft pressure door are positioned to allow air pressure from a cabin air outflow to increase the air pressure within an area surrounding the corresponding jet engine inside the corresponding intake housing, and maintain the temperature of the air surrounding the corresponding jet engine equal to the temperature of the cabin air outflow.

7. The aircraft of claim 2, further comprising:
a third jet engine secured to the elongate body proximate the tail; and
a third intake housing comprising secured to the elongate body proximate the tail and at least partially enclosing the third jet engine, the third intake housing comprising:
   at least one front pressure door located forward of the third jet engine, and
   at least one aft pressure door located behind the third jet engine,
   wherein each of the pressure doors is configured to allow air pressure from a cabin air outflow to increase the air pressure within an area surrounding the third jet engine inside the third intake housing,
   wherein the increased air pressure in the area surrounding the corresponding jet engine maintains the temperature of the air surrounding the corresponding jet engine equal to the temperature of the cabin air outflow,
   wherein each of the pressure doors is adapted to stay in place by pressure differential from cabin outflow air, and
   wherein each of the pressure doors, when held in place, prevents air from entering in to the third jet engine and shuts down the third jet engine.

8. The aircraft of claim 2, further comprising a fuel tank connected to at least one of the at least two jet engines, the fuel tank comprising a heater, the heater configured to heat fuel when the fuel is filled in the fuel tank.

9. The aircraft of claim 8, wherein the at least two wings are adapted to allow for distribution of the heated fuel about an upper surface of each of the at least two wings.

10. The aircraft of claim 2, further comprising:
at least two wing-mounted stabilizers comprising a first wing-mounted stabilizer and a second wing-mounted stabilizer, each of the at least two wing-mounted stabilizers configured to move upward and downward.

11. The aircraft of claim 10, further comprising:
a cockpit formed proximal to the front end; and
at least two elevators comprising a first elevator and second elevator,
each extending horizontally from the elongate body and away from the longitudinal axis, and symmetrically about the longitudinal axis,
each located between the cockpit and in front of the at least two wings, each elevator serving as a canard.

12. The aircraft of claim 11, wherein each of the at least two elevators are angled backward towards the rear end of the elongate body by an elevator angle with respect to the rear longitudinal axis between about 30° to about 75°.

13. The aircraft of claim 11, wherein the at least two elevators and the at least two wing-mounted stabilizers cooperate to assist in controlling stability of the aircraft.

14. The aircraft of claim 2, wherein each of the at least two jet engines comprises multi-axis vectored thrust technology, and wherein each of the at least two jet engines is capable of changing a direction of thrust with respect to the longitudinal axis to cause the aircraft to pitch up, down, left, or right.

15. The aircraft of claim 14, wherein, in flight, the aircraft is configured to move the nose up or down using the multi-axis vectored thrust, to maintain steady flight.

16. The aircraft of claim 2, wherein the AC is located forward of the CG.

17. The aircraft of claim 2, wherein each of the trailing edge portions have a straight profile.

18. The aircraft of claim 17, further comprising:
at least two intake housings comprising a first intake housing and second intake housing, the first intake housing secured to the first wing and at least partially enclosing the first jet engine, the second intake housing secured to the second wing and at least partially enclosing the second jet engine, each of the intake housings comprising:
   at least one front pressure door located forward of the corresponding jet engine, and
   at least one aft pressure door located behind the corresponding jet engine,
   wherein each of the pressure doors is configured to allow air pressure from a cabin air outflow to increase the air pressure within an area surrounding the corresponding jet engine inside the corresponding intake housing,
   wherein each of the pressure doors is adapted to stay in place by pressure differential from the cabin outflow air, and
   wherein the increased air pressure in the area surrounding the corresponding jet engine maintains the temperature of the air surrounding the corresponding jet engine equal to the temperature of the cabin air outflow;
at least two wing-mounted stabilizers comprising a first wing-mounted stabilizer and a second wing-mounted stabilizer, each of the at least two wing-mounted stabilizers configured to move upward and downward; and
at least one retractable landing gear assembly operatively associated with the elongated body and positioned under the elongated body, wherein the landing gear assembly is retractably enclosed within the elongated body,
wherein the trailing edge extends from a point of intersection of the trailing edge and the elongate body, the trailing edge lying forward of the point of intersection, and
wherein the AC is located forward of the CG.

* * * * *